United States Patent [19]  [11] 4,077,089
Dutaud  [45] Mar. 7, 1978

[54] PROCESS AND APPARATUS FOR MEAT DEBONING

[76] Inventor: Theodore Gregoire Dutaud, 143 Viewbank Crescent, Oakville, Ontario, Canada

[21] Appl. No.: 671,942
[22] Filed: Mar. 30, 1976
[51] Int. Cl.² ............................................. A22C 25/16
[52] U.S. Cl. ........................................ 17/1 G; 17/46; 17/56
[58] Field of Search ............................. 17/56, 46, 1 G
[56] References Cited
U.S. PATENT DOCUMENTS

| 2,858,222 | 10/1958 | Harris et al. | 17/46 |
| 3,741,772 | 6/1973 | McFarland | 17/46 |

Primary Examiner—Robert Peshock
Attorney, Agent, or Firm—Watson, Cole, Grindle & Watson

[57] ABSTRACT

The present invention provides a method and apparatus suitable for the deboning of materials such as fish and meat products which contain soft fleshy matter and boney components. The apparatus and process provide an improved separation of the boney components and fleshy material and is adapted, in one embodiment, to do so prior to comminuting the material. The invention also includes a novel foramenous housing and a novel process wherein the rate of processing of the material is independent of the rate at which the material is fed to the apparatus.

22 Claims, 21 Drawing Figures

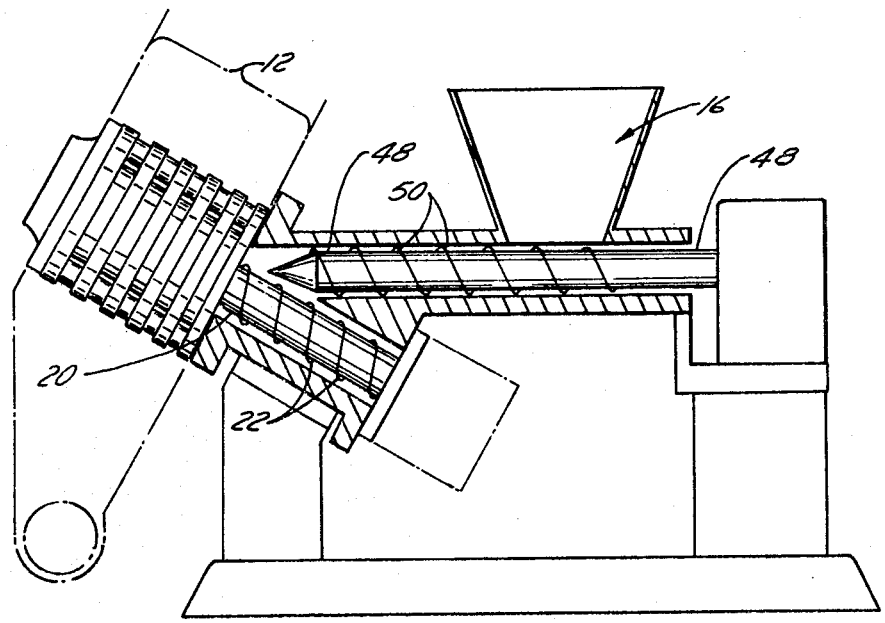
FIG. 2
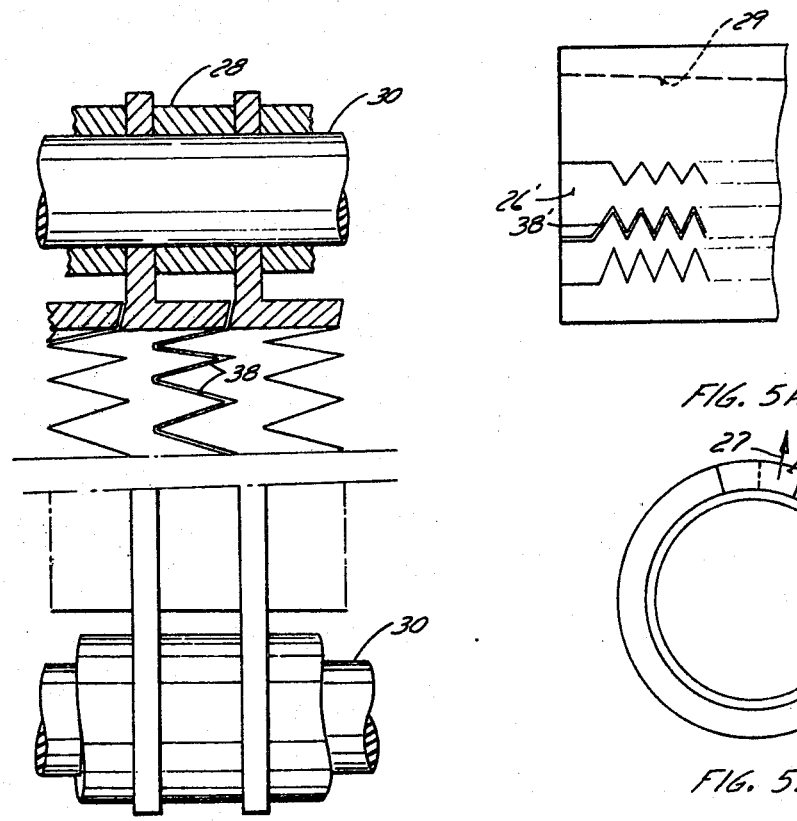
FIG. 4
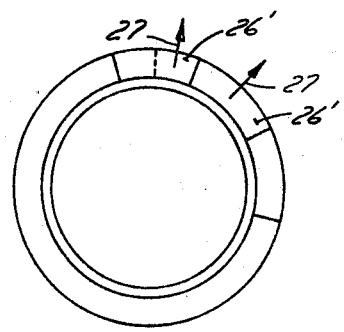
FIG. 5A
FIG. 5B

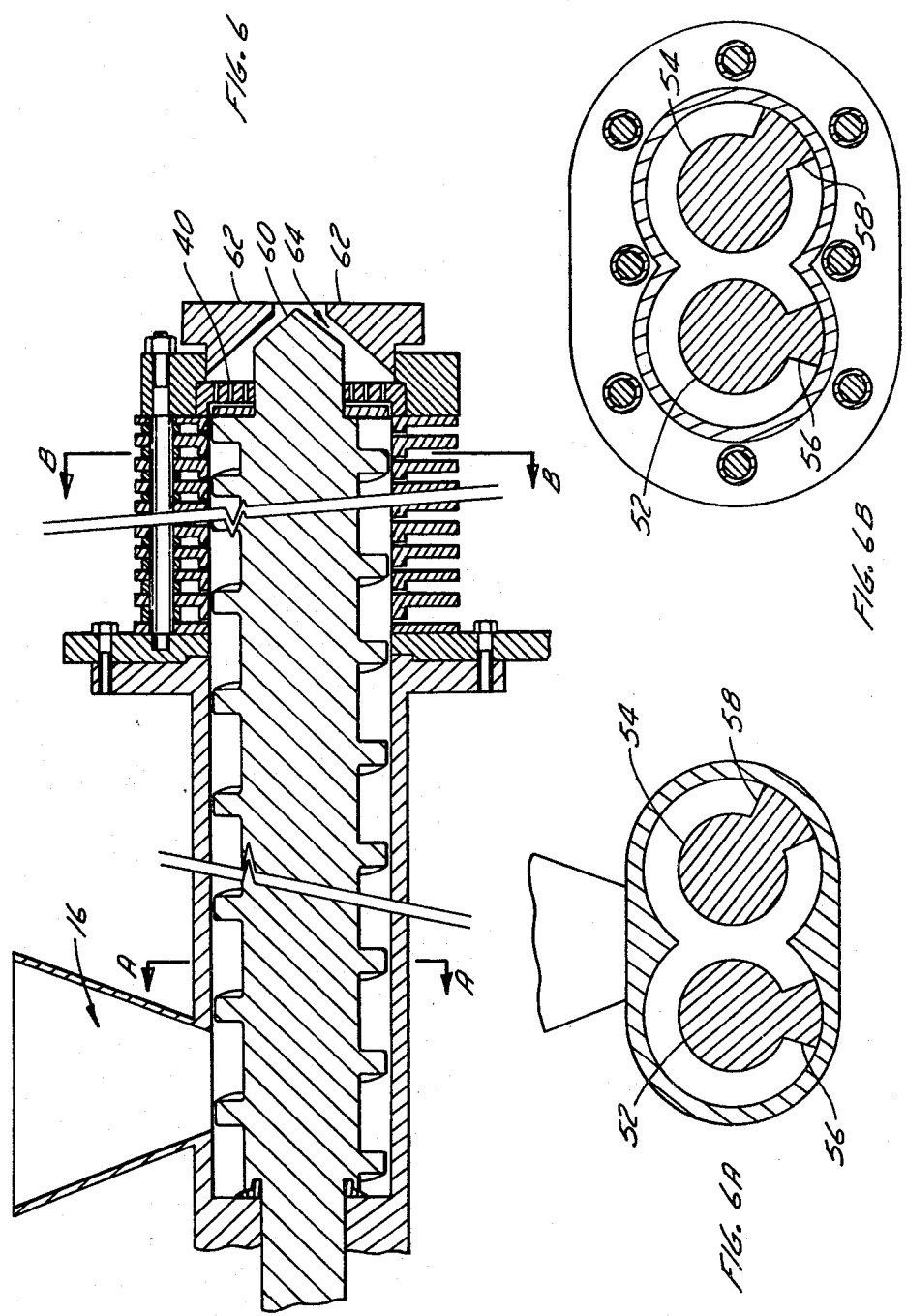

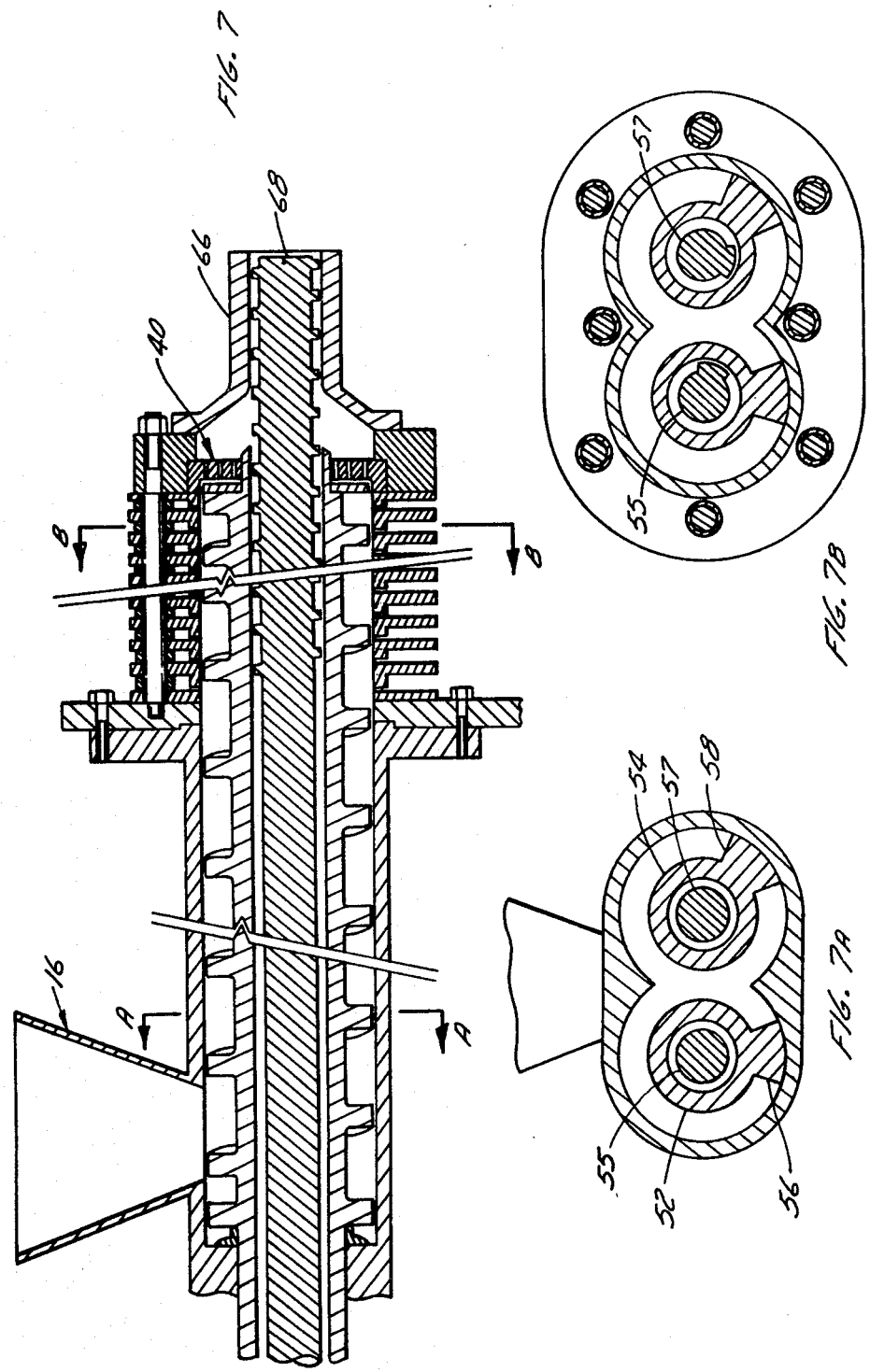

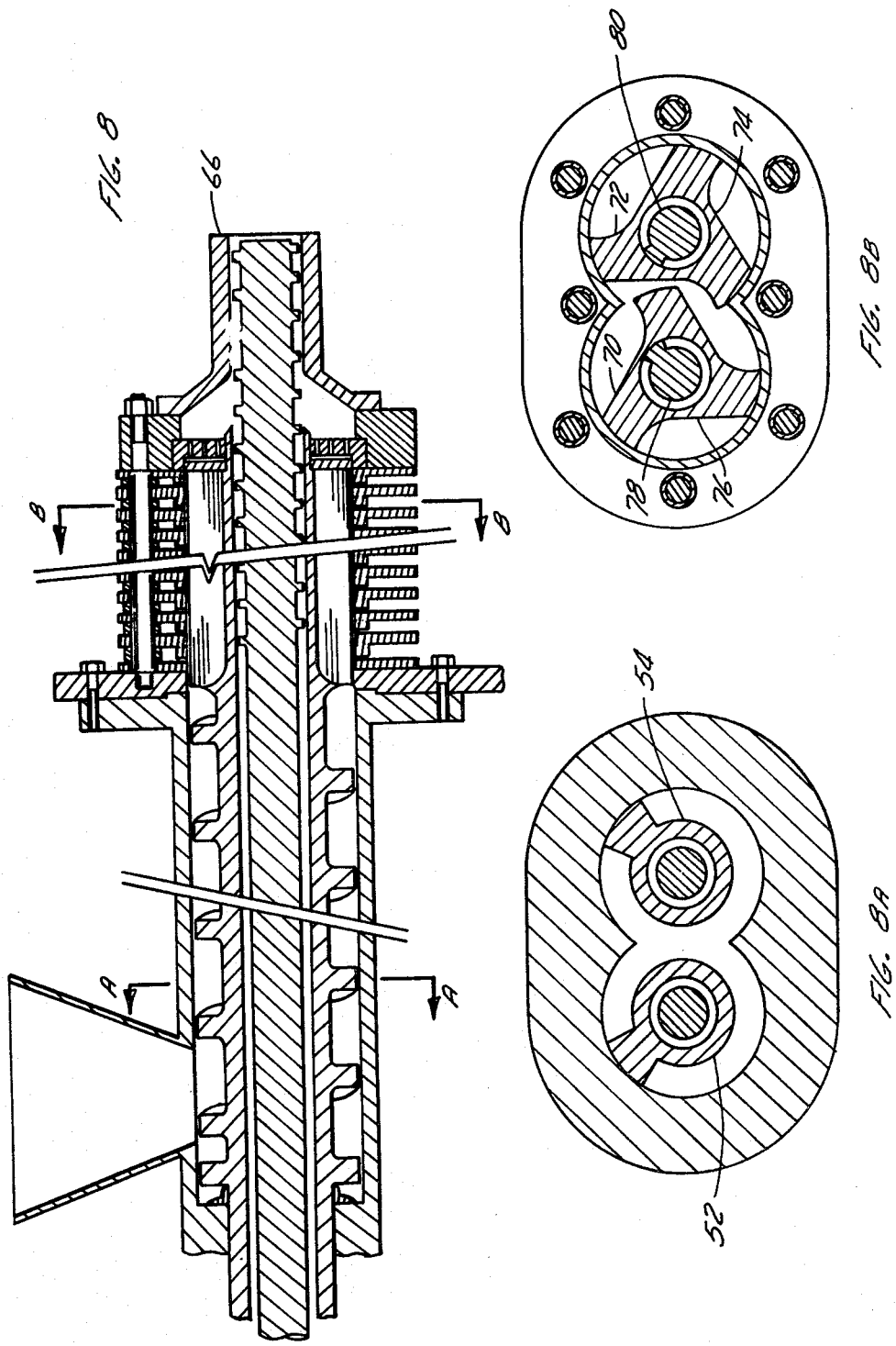

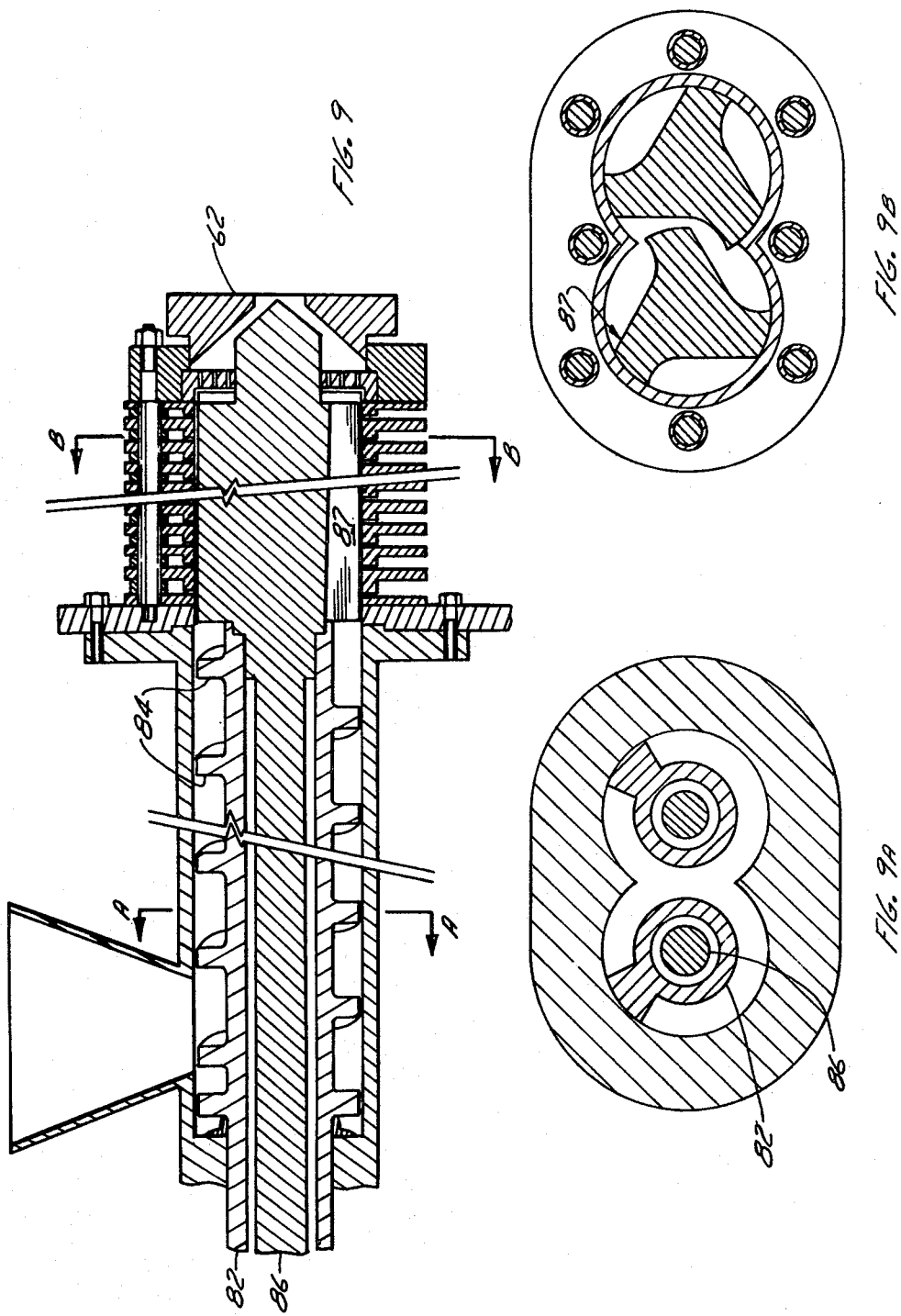

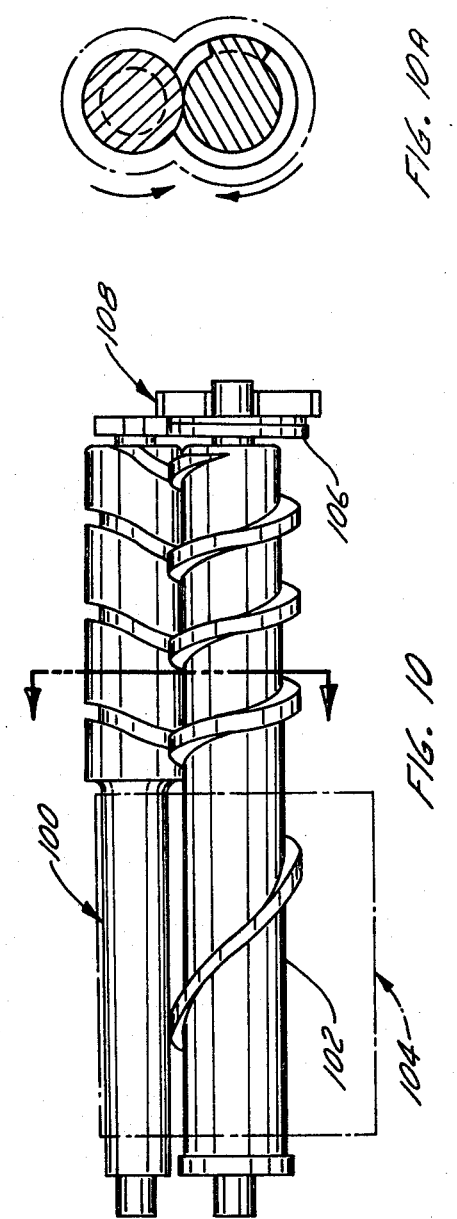

PROCESS AND APPARATUS FOR MEAT DEBONING

The present invention relates to a method and apparatus and more particularly, relates to a method and apparatus suitable for the deboning of various materials.

In the preparation of some foods, it is often necessary to remove the soft fleshy matter from the boney components such as, for example, in various fish and meat products. Desirably, the soft fleshy material which is removed should have a minimum of boney components therein.

Many proposals have been advanced in the prior art for separating the fleshy matter from the boney components. A first type of process and apparatus is, for example, illustrated in U.S. Pat. No. 3,594,190 which teaches the formation of a slurry – i.e. the bone and meat mixture is tumbled in a closed container in the presence of brine until the bones are cleaned and a meat slurry in formed. A somewhat similar process is illustrated in U.S. Pat. No. 3,248,752 to Segar et al wherein a partially cooked material is advanced to a meat removal station. The prior art also contains further proposals essentially relating to the step of softening the fleshy matter so as to aid in the removal of the same from the boney component of the material.

Various mechanical processes and apparatuses have also been proposed in the prior art and, in this respect, reference may be had to U.S. Pat. No. 2,734,537 to Geisler which shows a meat deboning apparatus wherein the material is projected against the wall of a cage. The violent impact produced effects separation of the meat from the bone. Somewhat along the same lines are the teachings in U.S. Pat. No. 2,784,446 to Beatty wherein a shot propelling mechanism is used.

Mechanical means are also illustrated in U.S. Pat. No. 3,256,555 to S. A. Paoli which teaches an apparatus wherein the meat and bones are subjected to the action of a plurality of members wherein the meat is scraped from the bone. The prior art also teaches subjecting the bone and meat material to high velocity jets of water or like liquid for the purpose of separating the fleshy matter from the boney components – see U.S. Pat. No. 3,364,518 to Brown et al.

A more recent proposal in the art is shown in U.S. Pat. No. 3,741,772 to A. R. McFarland which teaches a process for producing deboned meat products. Essentially, the apparatus employed therein includes a foramenous conduit having a rotary compression screw mounted therein. The comminuted material is carried by the screw which is progressively decreasing in conveying capacity from a feed end to a discharge end whereby a filter mat of boney components on the inside surface of the perforated conduit is formed. The soft fleshy material – i.e. the meat component, is forced through the perforations while the boney component is retained against the inner surface of the conduit and compacted in a tapered nonperforated section of the discharge end. In order to effect operation of the process in the apparatus taught, the material is initially comminuted into a relatively fine material.

As may be seen from the above, the prior art has advanced many proposals for the separation of the meat material from the bone. However, for one reason or another, many of these proposals have not achieved commercial success and even where such success has been obtained, various problems are encountered. For example, when the boney components and fleshy matter are comminuted, the degree of separation is not always that which is desirable and boney matter may be present in the material forced through the conduit perforations.

Accordingly, it is an object of the present invention to provide an improved apparatus and process for the separation of the boney components and fleshy material.

It is a further object of the present invention to provide an apparatus of the type above-described wherein the soft fleshy material is removed from the boney component prior to comminuting the bones.

It is a further object of the present invention to provide an improved foramenous housing for use in a deboning apparatus.

It is a still further object of the present invention to provide an improved process for producing deboned meat or fish products wherein the rate of processing of the material is independent of the rate of feed.

According to one aspect of the present invention, in an apparatus suitable for deboning materials such as fish and meat products which contain soft fleshy matter and boney components, wherein the apparatus includes a foramenous housing surrounding a rotatably driven shaft having means thereon for forcing the fleshy matter through the foramenous housing, there is provided the improvement wherein the housing comprises a plurality of individual plate members, each of said plate members being in an adjustable spaced-apart relationship with respect to an adjacent plate member to form a gap therebetween, means holding the plate members in said spaced-apart relationship, said gap having a general zig-zag configuration.

In one embodiment of the above, each of the plate members is of a substantially annular configuration and thus extends circumferentially with respect to the rotatable shaft and the means thereon. It will be understood that in lieu of being a complete annular member, each plate member may be comprised of several segments forming the same.

The annular plates are held together by suitable means in a spaced-apart relationship. Various cooperating means may be used and it is preferred that the arrangement is such that the degree of separation – i.e. the gap between adjacent plate members is adjustable. By so doing, as the material to be deboned moves axially of the cavity within the housing, the gaps between adjacent plate members may become progressively smaller. In effect, the larger chunks of the soft fleshy matter will thus be forced out at the beginning of its passage through the housing while at the terminal end thereof, smaller pieces of the fleshy matter will be forced through the gaps. Naturally, many other arrangements may be employed if so desired.

In a further embodiment of the above, each plate member may be formed so as to extend substantially axially of the shaft in a spaced-apart relationship with an adjacent axially extending member to thereby form a longitudinally extending gap between adjacent members. As in the above embodiment, each of the gaps would be of a general zig-zag configuration — i.e. having a plurality of teeth on the edges of each member. Again, the spacing of the individual plate members may be such so as to provide an adjustable gap.

In a further aspect of the present invention, in an apparatus suitable for deboning materials such as fish and meat products which contain soft fleshy matter and boney components, and which apparatus includes a foramenous housing surrounding a rotatably driven shaft having means thereon for forcing the fleshy matter through the foramenous housing, there is provided the improvement wherein said means comprise at least one substantially longitudinally and axially extending flight mounted on said shaft in a slightly spaced-apart relationship with the interior surface of said foramenous housing.

As previously discussed, it is known in the art - see U.S. Pat. No. 3,741,772 issued June 26, 1973 to A. R. McFarland, to employ a conveyor screw within a perforated conduit and operate the screw to force soft fleshy matters through the perforations of the conduit. However, the rotatably driven shaft is, as noted above, a conveyor screw having helical flights thereon. It then becomes necessary to comminute or cut the material being fed to the conveyor screw into sufficiently fine material. However, by using axially extending flights, the material can be introduced into a turbulator section of the apparatus without the necessity of comminuting the material.

The rotatable shaft having the axially extending flights thereon causes the material to orient itself and imparts a rolling motion thereto.

In the above regard, it will be understood that the total distance travelled by the material in the turbulator section of the apparatus will depend on the rotational speed at which the shaft is driven. Thus, in the conventional conveyor screw arrangement such as is shown in U.S. Pat. No. 3,741,772, the total helical path is fixed due to the physical arrangement of the screw and the rate at which the material is processed is directly dependent on the rate at which the screw is driven.

It will also be understood that the use of "substantially longitudinally and axially extending flights" includes those flights which may have a slight helical form. Thus, the flights do not have to be straight ones extending directly longitudinally and axially of the shaft, but may have a slight curvature. Even in such an embodiment, the rate of processing the material is substantially dependent on the rate of feed.

In a further aspect of the present invention, in a method suitable for deboning material such as fish and meat products which contain soft fleshy matter and boney components, there is provided the improvement comprising the steps of feeding at a first rate the material into a turbulating chamber having a foramenous housing surrounding a rotatable shaft having means thereon for separating the fleshy matter from the boney component and for forcing the fleshy matter through the foramenous housing, and rotating said shaft having said means thereon at a rate independent of the rate at which said material is fed through said turbulating chamber.

In this method aspect of the invention, preferably the boney matter is comminuted following separation of the material. The comminuted boney component may be discharged through a suitable arrangement to create a more uniform controlled back pressure.

In still a further aspect of the present invention, there is provided an apparatus suitable for deboning materials such as fish and meat products which contain soft fleshy matter and boney components, the apparatus comprising a rotatable shaft, a foramenous housing mounted concentrically about said rotatable shaft, means on said shaft for separating soft fleshy matter from a boney component and forcing the soft fleshy matter through the foramenous housing, means for rotatably driving said rotatable shaft, an inlet end and a discharge end, means for introducing said material to said inlet end, the apparatus characterized wherein said means for introducing the material to said inlet end are driven at a rate independently of the rate at which said shaft is driven, said discharge end including means for varying the rate of discharge of the material therefrom with respect to the aforesaid rates.

In a preferred embodiment of the above, the discharge means may comprise a rotatably driven discharge screw mounted interiorly of and concentrically with said shaft. The means for controlling the rate of discharge may include the rate at which said discharge screw is driven and as well, a conical member may be mounted thereabout for varying the back pressure within the foramenous housing.

In one embodiment, the discharge means may include two or three helical turns of the flights at the discharge end of the turbulator.

Having thus generally described the invention, reference will be made to the accompanying drawings illustrating embodiments thereof, and which:

FIG. 2 is a side elevational view, partially in section, of a further embodiment of an apparatus similar to that of FIG. 1;

FIG. 4 is a side elevational view, partially in section, of the turbulating chamber plates in an assembled condition;

FIGS. 5A and 5B are end and side views respectively of an alternative embodiment of the turbulating chamber;

FIGS. 6, 6A and 6B are sectional views illustrating a further embodiment of an apparatus according to the present invention;

FIGS. 7, 7A and 7B are sectional views of a still further embodiment of the apparatus employing a twin screw arrangement;

FIGS. 8, 8A and 8B are sectional views illustrating a still further embodiment of an apparatus constructed according to the present invention;

FIGS. 9, 9A and 9B are sectional views illustrating further embodiments of an apparatus according to the present invention; and FIGS. 10 and 10A are elevational and sectional views respectively to illustrate a further embodiment of a feed conveyor.

Figure 1:
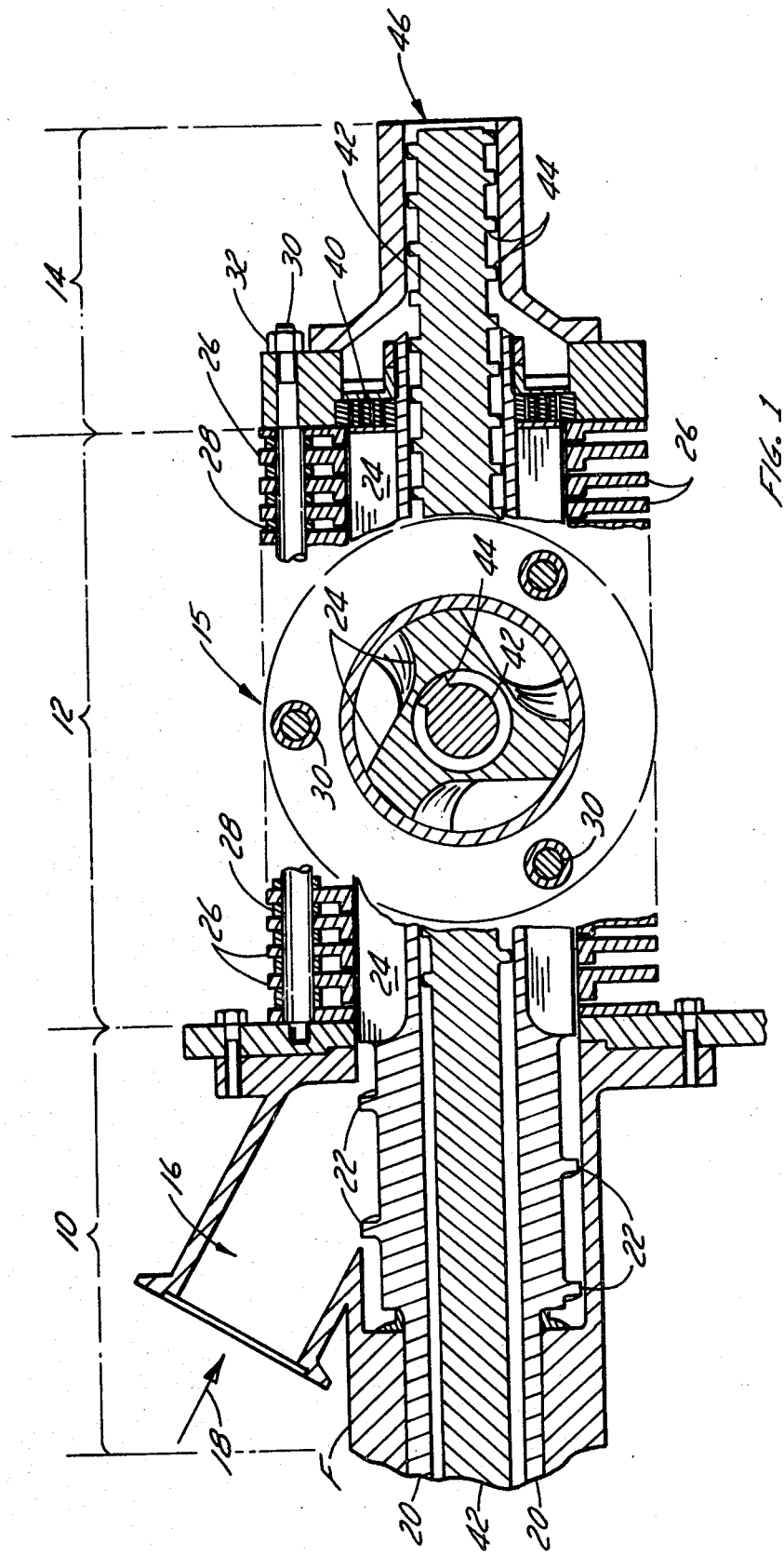
FIG. 1 is a side sectional view, including a partial cross section, of one embodiment of an apparatus according to the present invention.

Referring to the drawings in greater detail and by reference characters thereto, the deboning apparatus illustrated in FIG. 1 includes a feed section 10, a turbulating chamber 12 and a discharge section 14.

Feed section 10 includes a cylindrical conduit 16 forming an integral part of frame F to which the material to be deboned is fed as indicated by arrow 18. Within frame F is a shaft 20 having a plurality of helically extending flights 22 communicating with the conduit 16.

As shown in FIG. 1, helical flights 22 extend for only a short portion of the shaft 20 - i.e. for the feed in section 10. In turbulating section 12, there are provided a plurality of substantially longitudinally and axially extending flights 24. Flights 24 perform the turbulating action on the material to be deboned so as to "work" the material and impart an orienting, rolling and rotating action to the material. In FIG. 1, helical flights 22 are illustrated as extending substantially throughout feed in portion 10; it will be understood that they may extend only for a portion thereof such that the rate of material feed to the turbulating section 12 is independent of the rate at which shaft 20 rotates. In other words, the material feed in means (not shown) do not comprise per se the helical flights, but rather further independent means are employed with the helical flights 22 being employed as a "back up" feed means.

Flights 24, as aforementioned, are not necessarily "straight" and axially extending in a straight line path. In other words, as shown in the insert generally designated by reference numeral 15, and which insert is a cross-sectional view of the turbulator section, flights 24 have a very slight helical form. In practice, each flight 24 may, for its length in the turbulator section, have a slightly curved configuration equivalent to, for example, between one-eighth turn and one turn.

Surrounding turbulator 24 within separation chamber 12 is a cylindrical housing which is comprised of a plurality of individual plate members 26. Plates 26 are held together in a predetermined position by means of a nut and bolt arrangement 30, 32. Also, as may be seen from FIG. 1, spacers 28 are provided intermediate plates 26.

Figure 3A:
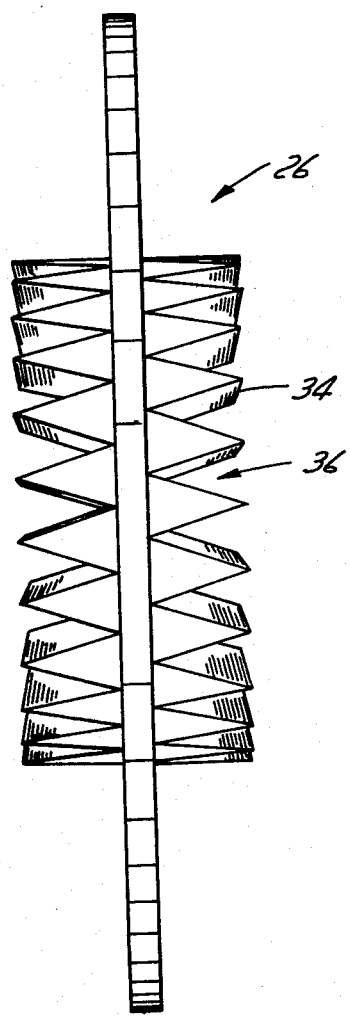
FIGS. 3A and 3B are elevational views of disassembled plate members forming the housing of a turbulating chamber.
Figure 3B:
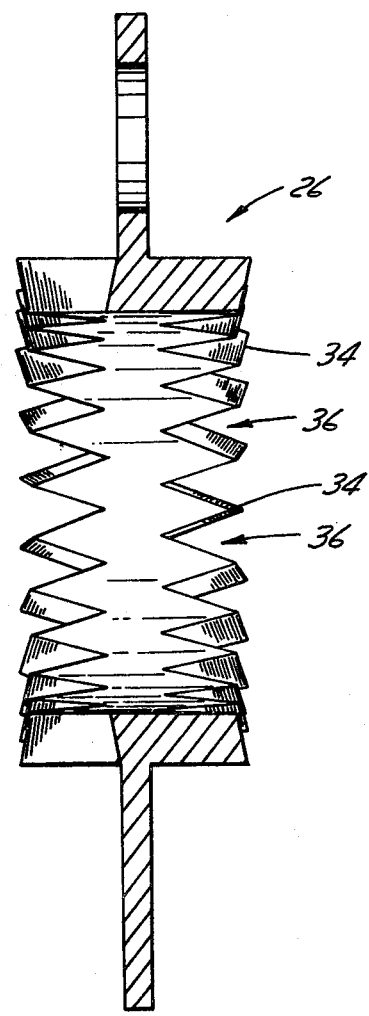

As may be seen from FIGS. 3A, 3B and 4, each plate 26 is of a generally annular configuration and has a plurality of teeth 34 with adjacent grooves 36 formed therein. Each plate 26 is formed such that teeth 34 are fed into the grooves or recesses 36 of an adjacent plate to form a zig-zag configuration. Through the use of spacers 28, the degree of juxtaposition of one plate to an adjacent one may be adjusted so as to leave a gap 38 therebetween. In other words, the housing about the turbulator section will have a plurality of circumferentially extending gaps with a zig-zag configuration. The opening or gap between plates 26 is controlled by spacers 28 which may be adjusted to give the desired gap. As will be evident from the drawings, the plates may easily be assembled and disassembled for cleaning purposes.

As discharge section or end 14, there is provided a knife and sieve arrangement generally designated by reference numeral 40. This arrangement is adapted to cut or comminute the bone component of the material and the screen or sieve will only permit boney matter which has been comminuted to a desired size to pass therethrough.

A bone discharge screw 42 is mounted concentrically and interiorly of shaft 20 for purposes of receiving the comminuted boney material from knife assembly 40. Bone discharge screw 42 may have common drive means with shaft 20 and has a plurality of helically extending flights 44 on the exterior surface thereof to discharge the comminuted material at end 46.

In the process, the boney material with the flesh thereon is fed to conduit 16 by any suitable feed means (not shown) at a desired speed and pressure. The feeding of material is aided by helical flights 22 on shaft 20 to turbulating chamber 12 wherein axial flights 24 cause the material to be oriented, rolled, rotated and worked. It will be noted that the rotational speed at which flights 24 are driven is independent of the rate at which the material is being fed. Flights 24 continuously present the material or product to the inside surface of the separation or turbulator chamber (formed of plates 26) which "peels" the fleshy portion from the boney portion. The fleshy portion is then forced through gaps 38 between spaced-apart plates 26 while retaining the boney component within the housing. By so doing, a minimum of breakdown of the bone results.

Following removal of the fleshy material, the boney component is fed to knife and sieve assembly 40 wherein it is comminuted and discharged by bone discharge screw 42. It will be noted that bone discharge screw 42 may be driven at a speed or velocity independent of the speed or velocity of screw 20. Thus, the rate or removal of the comminuted boney component will be independent of the other operating parameters and thus enabling a control of the back pressure in the apparatus. This, in turn, can control the residence time of the material in the separation chamber 12.

The arrangement of plates 26 may be varied as desired. Thus, for example, reference may be had to FIGS. 5A and 5B wherein plates 26' consist of longitudinally extending segments having the teeth arrangement referred to above to give a gap 38' therebetween. The amount of opening or gap between plates 26' may be controlled by having the segments movable outwardly as indicated by arrows 27. Furthermore, it will be noted that the internal diameter 29 may be tapered to match tapered flights. In this respect, the turbulator may be provided with means of lateral movement relative to the separation chamber to maintain a desired clearance between the turbulator and the internal diameter.

As above mentioned, the spacing of plates 26 may be accomplished by means of spacers 28 to conrol gap 38. Also, variations of the tooth or zig-zag pattern may be employed as long as the plates maintain the desired gap therebetween. In this respect, various arrangements may be used such as the tooth form, but where the teeth have a radius at the base and tips; a rectangular tooth form; a totally radiused configuration; etc.

It is also possible, according to the present invention to locate the comminuting or knife assembly prior to the separation chamber. Although this creates the prior art problem of controlling the amount of bone chips passing through the gaps between the plates, the initial knife assembly could comminute the boney material into relatively large pieces with a further knife assembly being located downstream (in the direction of flow of the material) of the separation chamber.

Furthermore, plates 26 could be arranged in such a fashion that the plates are spaced to provide progressively decreasing gaps in the downstream direction whereby the fleshy component is removed in the initial section in relatively large chunks. Still further, if so desired, the plates may be spaced to provide progressively increasing gaps in the direction of material flow in order to remove fluids and fat-like materials prior to removal of the fleshy components. Naturally, as will be understood by those skilled in this art, combinations of the above arrangements may be employed to achieve a desired sequential multi-stage processing.

Referring to FIG. 2, the embodiment illustrated therein provides a feed in conduit 16 having a primary feed in screw 48 operatively associated therewith. Feed in screw 48 has a plurality of helical flights 50 on the exterior surface thereof to advance the material from conduit 16 to a secondary feed in comprising shaft 20 having an initial portion thereof with helical flights 22. Shaft 20 continues through turbulator chamber 12 and has substantially axially and longitudinally extending flights thereon as was discussed with respect to FIG. 1. It will be noted that the rate of feed in of material to turbulator chamber 12 is primarily dependent on the operation of shaft 48 with helical flights 22 on shaft 20 not performing the primary feed in function.

Reference will now be had to FIGS. 6 to 9 illustrating further embodiments of the present invention. Many of the components illustrated therein are similar to those discussed with respect to FIG. 1 and thus will not be described in any great detail. For example, the foramenous housing comprised of plates 26, in each case, is substantially similar to that of FIG. 1.

Turning to FIG. 6, the apparatus includes a feed in conduit 16 operatively connecting with a conduit having a pair of side by side shafts 52 and 54 with intermeshing helical flights 56 and 58 respectively thereon. Shafts 52 and 54 extend through both the feed in section and the turbulating chamber. In other words, the twin screw arrangement does not employ the axially and longitudinally extending flights previously discussed. Nevertheless, employing a twin screw arrangement even without the axially extending flights has found to present several advantageous features in the operation of the apparatus.

As discussed with respect to previous embodiments, there is provided a knife and sieve arrangement 40 for commununting the boney material at the discharge and of the apparatus.

As may be seen in FIG. 6, each of the screws of the twin screw arrangement terminates to have a somewhat conical configuration as designated by reference numeral 60 with respect to screw or shaft 52. A discharge member 62 is secured to the frame section of the apparatus and which discharge member defines a passage 64 between conical end 60 and member 62. Preferably, member 62 is adjustably mounted with respect to the frame of the apparatus and thus the opening provided by passage 64 and inherently, the discharge rate of the material thereto, may be varied to provide a control of the back pressure which is independent of the rate of rotation of the screws.

In FIG. 7, an arrangement somewhat similar to that described and shown in FIG. 6 is employed. Thus, there are provided twin screws 52 and 54 having intermeshing helical flights 56 and 58 respectively. However, mounted concentrically with and interiorly of screws 52 and 54 are bone discharge screws 55 and 57 respectively. The rate of rotation of screws 55 and 57 may be independent of screws 52 and 54 to provide an independent control over the rate of removal of the comminuted boney material and thus, the back pressure within the system.

Referring to FIG. 8, a twin screw arrangement (52, 54) is also employed; however, in the turbulator section of the apparatus, there is provided substantially axially and longitudinally extending flights 70 and 72. Concentrically mounted bone discharge screws 78 and 80 are provided interiorly of the respective shafts.

In FIG. 9, a feed in conduit 16 is adapted to feed in the material to be deboned to a shaft 82 having helical flights 84 thereon. As illustrated in cross-sectional view in FIGS. 9A and 9B, a twin screw arrangement is employed. Mounted interiorly of and concentrically with shaft 82 is a further shaft 86 which, as seen in FIG. 9, has, in the turbulating chamber, substantially axially and longitudinally extending flights 87 thereon. In other words, a screw arrangement 82 is employed to feed the material to the turbulating chamber wherein the longitudinally and axially extending flights are employed on a shaft 86 mounted interiorly of shaft 82. An adjustable discharge member 62 is employed as was described in FIG. 6.

Referring to FIGS. 10 and 10A, there is provided a pair of conveyor screws 100 and 102 with screw 102 having a helical flight thereon and screw 100 meshing therewith. The material to be deboned is fed into a suitable feed hopper designated by reference numeral 104 and conveyed forward by screw 102. It will be noted that the width of the flight in screw 102 is equal to (less clearance) the distance between the flight of screw 102. In this manner, a seal is created along the contact point of the two screws resulting in a positive displacement of the material towards the front end of the screw. A knife assembly 106 rotates with the screw and a stationary breaker plate 108 is provided through which the material flows in order to presize the same prior to the entry of the material into the separation chamber. It will be noted that only one drive means is required to drive screw 102 which in turn rotatably drives screw 100. If desired, a suitable system of gears may be employed to maintain both screws in the required relative position to each other with no metal to metal contact.

As may be seen from the above, many possible embodiments may be employed. Thus, there may be employed a twin screw feed-in with either a single or twin screw turbulator section having either helical or axially extending flights thereon. The rotational speed and the material flow-through speed may be independently adjustable. Furthermore, it will be understood that the above described embodiments are for purposes of illustration only, and that many changes and modifications may be made thereto without departing from the spirit and scope of the invention.

The embodiments of the invention in which an exclusive property or privilege is claimed are defined as follows:

1. An apparatus suitable for deboning materials such as fish and meat products which contain soft fleshy matter and boney components, the apparatus comprising:

a turbulating chamber having an inlet end, an outlet end, and a foramenous housing surrounding a rotatable shaft having means thereon for separating the soft fleshy matter from the boney components and forcing the soft fleshy matter through the foramenous housing;

means for feeding the material to be deboned through the inlet end of the turbulating chamber;

means for rotatably driving the rotatable shaft having means thereon;

the apparatus characterized wherein said means for feeding the material to the inlet end of the turbulator feeds the material at a rate independent of the rate at which the means for rotating the rotatable shaft is driven.

2. The apparatus of claim 1, further comprising means for comminuting the boney material at the discharge end of the turbulating chamber.

3. The apparatus of claim 1, wherein said means on said shaft for separating the soft fleshy matter from the boney components comprises at least one substantially longitudinally and axially extending flights mounted in a slightly spaced-apart relationship with an interior surface of said foramenous housing.

4. The apparatus of claim 3, wherein said means for feeding the material to the inlet end of the turbulator comprises a rotatable screw.

5. The apparatus of claim 3, wherein said means for feeding the material to the inlet end of the turbulator comprises a twin screw feed-in.

6. The apparatus of claim 1, wherein said means on said shaft for separating the soft fleshy matter from the boney components comprises a plurality of substantially longitudinally and axially extending flights mounted in a slightly spaced-apart relationship with an interior surface of said foramenous housing.

7. The apparatus of claim 3, comprising means for removing deboned material from said outlet end of said turbulating chamber, said means comprising a discharge screw.

8. The apparatus of claim 7, wherein said discharge screw is mounted interiorly of and concentrically with said rotatable shaft.

9. The apparatus of claim 3, including means for comminuting the deboned material at the discharge end of the turbulating chamber, means for removing said comminuted material, said foramenous housing comprising a plurality of individual plate members, each of said plate members being in an adjustable spaced-apart relationship with respect to an adjacent plate member to form a gap therebetween, means holding the plate members in said spaced-apart relationship, said gap having a general zigzag configuration.

10. The apparatus of claim 9, wherein each of said plate members extends longitudinally of said rotatable shaft, the gap formed between adjacent plate members also extending longitudinally with respect to said rotatable shaft.

11. The apparatus of claim 9, wherein each plate member has a substantially annular configuration and extends circumferentially of said rotatable shaft.

12. An apparatus suitable for deboning material such as fish and meat products which contain soft fleshy matter and boney components, the apparatus comprising a turbulating chamber having an inlet end, an outlet end, and a foramenous housing surrounding a rotatable shaft having means thereon for separating the soft fleshy matter from the boney components and forcing the soft fleshy matter through the foramenous housing, means for feeding the material to be deboned to the inlet end of the turbulating chamber, means for rotatably driving said rotatable shaft, said means for feeding the material to said inlet end of said turbulating chamber being operated independently of the means for driving the rotatable shaft such that the rate of feed of the material is independent of the rate of throughput.

13. In an apparatus suitable for deboning materials such as fish and meat products which contain soft fleshy matter and boney components, the apparatus including a foramenous housing surrounding a rotatably driven shaft having means thereon for forcing the fleshy matter through the foramenous housing, the improvement wherein the housing comprises a plurality of individual plate members, each of said plate members being in an adjustable spaced-apart relationship with respect to an adjacent plate member to form a gap therebetween, means holding the plate members in said spaced-apart relationship, said gap having a general zig-zag configuration.

14. The apparatus of claim 13, wherein a pair of rotatably driven shafts are mounted within said foramenous housing, one of said shafts having helical flights thereon, and a second of said shafts having a groove adapted to mate with said helical flights of said first shaft.

15. The apparatus of claim 13 wherein each plate member has a substantially annular configuration and extends circumferentially of said rotatable shaft.

16. The apparatus of claim 13, wherein each of said plate members extends longitudinally of said rotatable shaft, the gap formed between adjacent plate members also extending longitudinally with respect to said rotatable shaft.

17. The apparatus of claim 13, wherein said means on said rotatable shaft comprises at least one longitudinally and axially extending flight in a spaced-apart relationship with the interior of said foramenous housing.

18. The apparatus of claim 1, further comprising discharge means located at the outlet end of said turbulating chamber, said discharge means comprising a rotatably driven discharge screw mounted interiorly of and concentrically with said rotatable shaft.

19. The apparatus of claim 3, further including means located at the outlet end of said turbulating chamber for controlling the rate at which the comminuted boney components are discharged, said means comprising a discharge control member, said member being adjustable to vary a discharge gap through which the boney components are discharged.

20. In an apparatus suitable for deboning materials such as fish and meat products which contain soft fleshy matter and boney components, the apparatus including a foramenous housing surrounding a rotatably driven shaft having means thereon for forcing the fleshy matter through the foramenous housing, the improvement wherein said means comprises at least one substantially longitudinally and axially extending flight mounted on said shaft in a slightly spaced-apart relationship with the interior surface of said foramenous housing.

21. The apparatus of claim 20 wherein said means comprises a plurality of substantially longitudinally and axially extending flights mounted on said shaft.

22. In an apparatus suitable for deboning materials such as fish and meat products which contain soft fleshy matter and boney components, the apparatus including a foramenous housing in a turbulator section, the improvement comprising a pair of rotatably driven shafts in a side by side relationship, at least one of the shafts having flights thereon, the flights on said one shaft intermeshing with cooperative means on the other of said shafts.

* * * * *